US010447852B2

(12) United States Patent
Baker et al.

(10) Patent No.: US 10,447,852 B2
(45) Date of Patent: Oct. 15, 2019

(54) INBOUND COMMUNICATION PROCESSING SYSTEM WITH INTELLIGENT INTERACTIVE GRAPHICAL USER INTERFACE

(71) Applicant: UnitedHealth Group Incorporated, Minnetonka, MN (US)

(72) Inventors: Michael Lee Baker, Chanhassen, MN (US); David Shapiro, Minneapolis, MN (US); Lee A. Butterworth, Excelsior, MN (US); Siddhartha Bothra, Zionsville, IN (US); Matthew N. Horton, De Forest, WI (US); Wayne White, Peoria, AZ (US); Thomas John Allenburg, Edina, MN (US); Leslee Matthews, Vinton, VA (US); Lisa Marie Heath, Racine, WI (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 0 days.

(21) Appl. No.: 15/817,532

(22) Filed: Nov. 20, 2017

(65) Prior Publication Data

US 2018/0146091 A1 May 24, 2018

Related U.S. Application Data

(60) Provisional application No. 62/425,788, filed on Nov. 23, 2016.

(51) Int. Cl.
*H04M 3/42* (2006.01)
*H04M 3/493* (2006.01)
*H04M 3/523* (2006.01)
*H04M 1/725* (2006.01)
*H04L 29/06* (2006.01)
*G06Q 10/10* (2012.01)
*G06F 9/451* (2018.01)

(52) U.S. Cl.
CPC ............ *H04M 3/493* (2013.01); *G06F 9/451* (2018.02); *G06Q 10/1095* (2013.01); *H04L 63/08* (2013.01); *H04M 1/72522* (2013.01); *H04M 1/72566* (2013.01); *H04M 3/5235* (2013.01)

(58) Field of Classification Search
CPC ............ H04M 3/493; H04M 1/72522; H04M 3/5235; H04M 1/72566; G06F 9/451; G06Q 10/1095; H04L 63/08
USPC ...................................... 455/414.1; 370/338
See application file for complete search history.

(56) References Cited

U.S. PATENT DOCUMENTS

2003/0220827 A1\* 11/2003 Murphy ........... G06Q 10/06314 705/7.21
2018/0007203 A1\* 1/2018 Batlle ................. H04M 3/5166
2018/0063328 A1\* 3/2018 Eisner ................. H04M 3/5133

\* cited by examiner

*Primary Examiner* — Marcos Batista
(74) *Attorney, Agent, or Firm* — Seyfarth Shaw LLP; Brian Michaelis

(57) ABSTRACT

Systems for call processing access and provide structured data about a customer to a representative, where the data is configured and presented through an optimized network are provided. The disclosed call processing systems provide a tailored, interactive graphical user interface (GUI) that provides access to specific user-focused internal and external data resources, presented to the representative, to allow the representative to drive conversations and address the customer's needs quickly.

17 Claims, 6 Drawing Sheets

INBOUND COMMUNICATION PROCESSING SYSTEM WITH INTELLIGENT INTERACTIVE GRAPHICAL USER INTERFACE

RELATED APPLICATION

The present application claims priority from U.S. provisional patent application Ser. No. 62/425,788 filed Nov. 23, 2016, the entirety of which is incorporated herein by reference.

FIELD OF TECHNOLOGY

The present disclosure relates generally to secure networks, and more particularly to an inbound/outbound communication processing system.

BACKGROUND

When an individual contacts an organization, the individual may interact with an inbound/outbound communication system, such as an interactive voice response (IVR) system. The IVR system may determine an identity of the individual, as well as a representative capable of handling the individual's call.

Upon the IVR system determining the individual's identity, the inbound call system may generate a graphical user interface (GUI) with information about the individual. The GUI is then presented on a computing device of a representative, to aid the representative in handling the individual's call.

More specifically, the GUIs may provide physician contact information, thereby allowing the representative and the caller to engage in a three-way call with a provider's office, for example to schedule an appointment. These calls last minutes, provide and yield limited information, thereby being unsatisfactory to the caller.

However, the GUIs may also provide the representative with data specific to the caller, but in a layered structure such that vast amounts of caller-specific data is only displayed via the GUI after numerous windows, drop downs, etc. are opened and data is selected. Such GUIs are often limited to providing data that allows a representative to interact with the caller regarding only past events. Largely, the representative is left to process the data in some fashion and draw conclusions from same as the representative engages with the customer. Resources are wasted including the representatives time necessary to process this information and route the caller to other representatives should the current representative be unable to determine information and/or address the caller's needs. Little, if anything, is done to anticipate the needs of the customer or tailor the interaction to those needs. Bandwidth of such known systems is limited by the limited automation and intelligence integrated in such systems, with little intelligence and automation integrated at the user interface level for the benefit of the representative. Known systems instead rely on representatives to gather information, process information mentally, draw conclusions and make decisions that may be wrong or inaccurate.

SUMMARY

The present disclosure generally provides systems and methods that solve the technical problems associated with limited intelligence at the representative user interface and data association applied in routing of calls, such as processed through IVR, within an organization. Improved customer resource management (CRM) and communication processing systems according to the disclosure are configured to access and provide structured data mapped to an interactive graphical user interface (GUI) about a customer or network member to a representative or advocate. Customer/member data is configured and presented through an optimized network interface connected to one or more databases. The improved communication processing systems use the improved, interactive GUI to provide access to specific user-focused internal and external data resources presented to the representative to allow a representative to structure and drive communications and interfacing to address the network member's needs quickly and efficiently improving interactions, system bandwidth and customer/representative experience.

A further aspect of the present disclosure provides a tailored, interactive graphical user interface (GUI) presented to the representative and accessible to a CRM. Information displayed by the system in the GUI, including a prospective action to be performed determined from a plurality of prospective actions using at least one prioritization model, allows the representative or advocate to efficiently and in a structured manner, address the member's needs and offer suggestions to the member.

According to a further aspect of the present disclosure, improved call processing systems include a secure computing environment. The components of the secure computing environment may be connected via one or more data gateways. When a member contacts the secure computing environment within an organization, the member's communication is first directed to an input/output interface. The member's communication is then processed through the input/output interface to an authentication component to identify and authenticate the member initiating the communication. Once identified/authenticated, the member's information/data is gathered using a consumer engagement engine (CEE). A conversation management data storage houses data processed and/or generated by the CEE. In addition, the information determined by the CEE may be further structured and displayed on a tailored, interactive graphical user interface (GUI).

The interactive, tailored GUI provides interconnection to customer resources in order to provide services in real-time. For example, it directly integrates with third party scheduling/interaction systems to allow a representative to work with the customer to schedule needed appointment(s). This allows the representative to schedule the appointment for the caller without needing to engage in a multi-minute three-way call and avoid unnecessary utilization of network resources. The GUI of the present disclosure also provides prospective actions, next best actions, based on specific prioritization logic.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

BRIEF DESCRIPTION OF THE DRAWINGS

Embodiments of devices, systems, and methods are illustrated in the figures of the accompanying drawings, which are meant to be exemplary and not limiting, in which references are intended to refer to like or corresponding parts, and in which.

DETAILED DESCRIPTION

Figure 1:
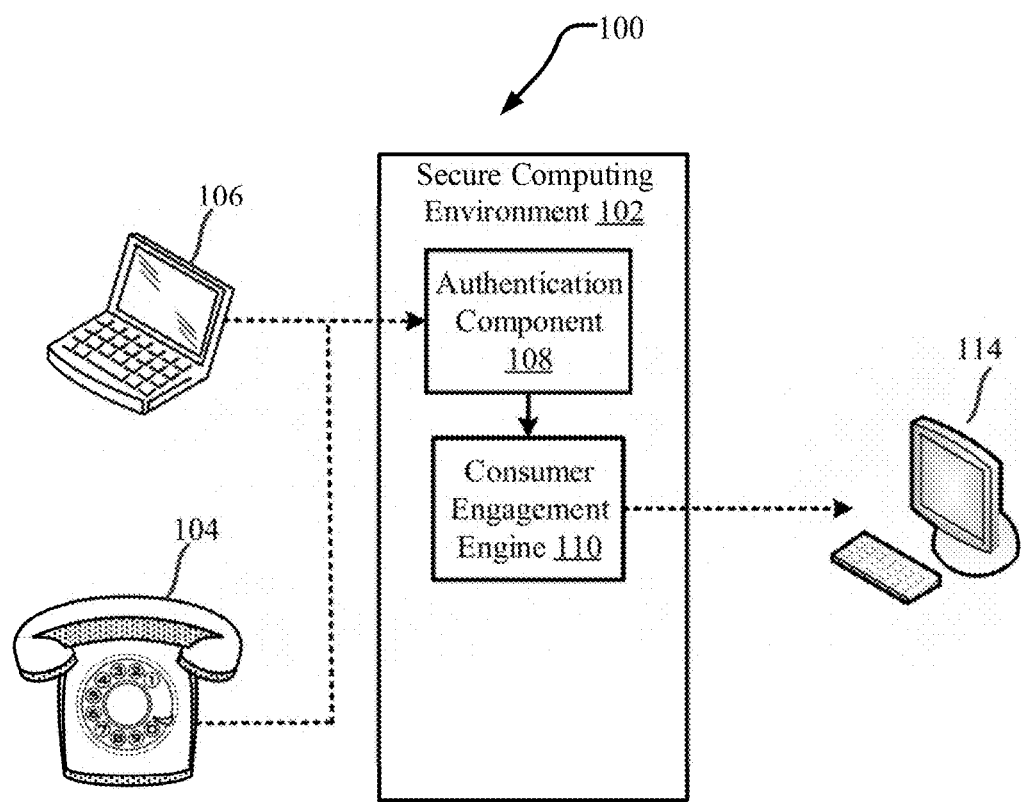
FIG. 1 illustrates an exemplary overview diagram of a system for intelligent personalization of a call or communication from a member of an organization with an appropriate advocate connected for communication within the network according to an embodiment of the present disclosure.

The detailed description of the present disclosure set forth herein makes reference to the accompanying drawings, which show various embodiments by way of illustration. While these embodiments are described in sufficient detail to enable those skilled in the art to practice the disclosure, it should be understood that other embodiments may be realized and that logical and physical changes may be made without departing form the spirit and scope of the disclosure. Thus, the detailed description herein is presented for purposes of illustration only and not limitation. For example, the functional blocks illustrated in the system may be alternatively configured and/or the steps recited in any of the method or process descriptions may be executed in an order other than as presented and are not limited to the order presented. Moreover, references to a singular embodiment may include plural embodiments, and references to more than one component may include a singular embodiment.

The present disclosure provides a system including components for extensive and specialized processes for transforming vast amounts of data, in the illustrative embodiment of data, e.g. healthcare data into consumable data. For example, member and household level data may be used for intelligently addressing a user's needs within a network or interconnected computing devices. Since in one embodiment healthcare data, which is highly sensitive and personal, is involved, one skilled in the art should appreciate that the data processing and intelligent routing of the present disclosure occur in a highly secure, networked computing environment. While the illustrative embodiments described herein may relate to healthcare information, it should be appreciated that secure systems as described may be implemented according to the disclosure for intelligent routing and transformation of other types of sensitive information such as financial information, legal information, national security information, or the like. The sophisticated, specialized, and specially configured networked computing environment and processes described herein, for example, facilitate the intelligent routing of a member with access to a network to a single organization advocate within the network capable of handling all, or nearly all, of the member's needs.

According to the disclosure advocates or representatives within an organization have access to a tailored graphical user interface (GUI) within an optimized, secure network to address member's needs as provided for by the advocate. The intelligent, interactive GUI is accessible through a computing device within the network. The tailored personalization and intelligent routing configuration(s) described herein streamlines and simplifies inbound communication from members of an organization. The tailored personalization and intelligent routing configuration(s) use several data points to present to an advocate data which can most appropriately address the member's concerns. Illustrative data points, for example in a healthcare implementation, used in determining routing and member interactions(s) include demographic data, recent medical or pharmacy claims data, clinical program enrollments and/or opportunities data, current health state data, incentive opportunities data, health risk assessment results data, and the like. The herein disclosed systems and methods provide improvements over present technical environments by using an intelligent consumer engagement engine and specially configured data sources to more precisely personalize engagements with members within the network via the intelligent interactive GUI. The intelligent routing described herein is not limited to typical channels of service, e.g., telephone. Rather, the intelligent personalization may be applied to various channels of communication such as instant messaging and email, for example.

Referring to FIG. 1, an overview diagram illustrating a system 100 for intelligent processing of a call or communication from a member of an organization with an appropriate advocate 114 connected for communication within the network is described. The system 100 according to the disclosure combines data and information with a campaign management system that enables members to get more efficient information they need in order for them to take action. The system 100 includes a secure computing environment or network 102. Various embodiments described herein involve sensitive and/or personal information. Thus, it should be appreciated that the secure computing environment 102 is not a general purpose computing environment. Rather, the secure computing environment 102 implements specially configured security parameters, and may be part of a highly secure network of multiple secure computing environments.

A member contacts the secure computing environment 102 within an organization via a telephone 104 or a computing device 106. The member's communication is directed to authentication component 108, which identifies the member initiating the communication and associates the member with the appropriate member file and accesses the appropriate member file. The authentication component may be an interactive voice response (IVR) component to determine an identity of the caller based on user input. It should be appreciated, however, that authentication techniques other than WR, such as voice recognition, may be implemented in accordance with the present disclosure.

Once identified, the member's information/data is processed and gathered using a consumer engagement engine (CEE) 110. The CEE 110 generally collects and processes user data and applies ordered rules or steps to determine a prospective action to be performed. The prospective action may be determined from a plurality of prospective actions using at least one prioritization model. This is also referred to herein as intelligent personalization to the member, and is described in greater detail hereinafter.

Figure 2:
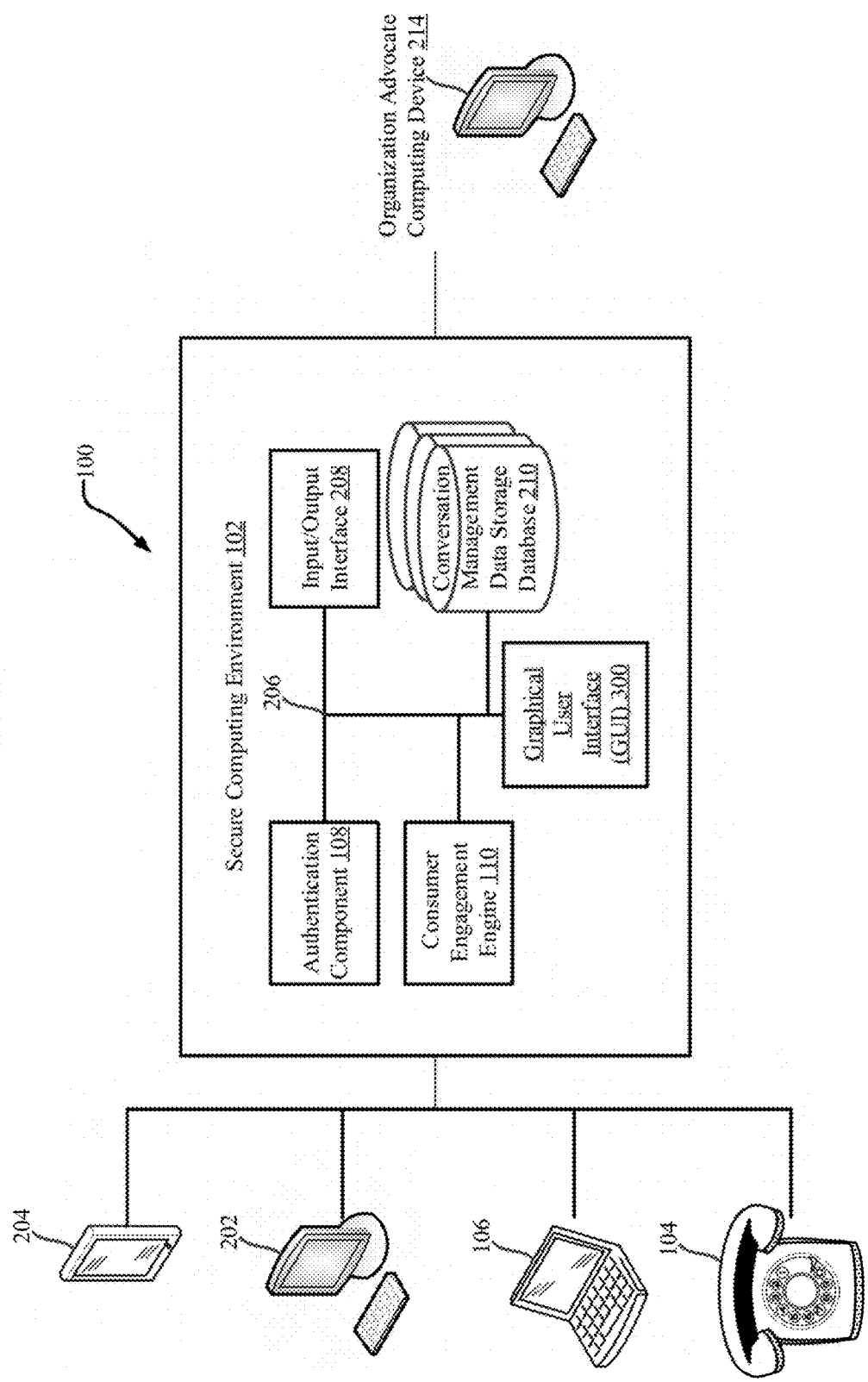
FIG. 2 illustrates a detailed system diagram of intelligent personalization of communication with a member of an organization by an organization advocate within a communication network.

Referring now to FIG. 2, the system 100 of FIG. 1 for intelligent personalization of interactions with a member of an organization, connecting to the network, to an appropriate advocate within the secure network is described in greater detail. The system 100 has a secure computing environment 102. A member may interact with the secure computing environment 102 using various technologies, e.g., audibly via the telephone 104, or electronically using the laptop 106, a desktop computer 202, or via an application on a smart device 204. The smart device 204 may be a smart phone, tablet, or other like device that implements software in the form of software applications.

The components of the secure computing environment 102 may be connected via one or more data gateways 206. In addition, various components of the secure computing environment 102 may be connected through direct linkages. The secure computing environment 102 includes an input/output interface 208 that enables the secure computing environment 102 to communicate data, control signals, data requests, and other information with other devices including computers, data sources, storage devices, and the like. The input/output interface 208 may communicate via wired or wireless connections. One skilled in the art should appreciate that the secure computing environment 102 may receive audio, image, text, video, and other inputs and transmit tailored user interface (UI) data to another computer or other source via the input/output interface 208.

Figure 3A:
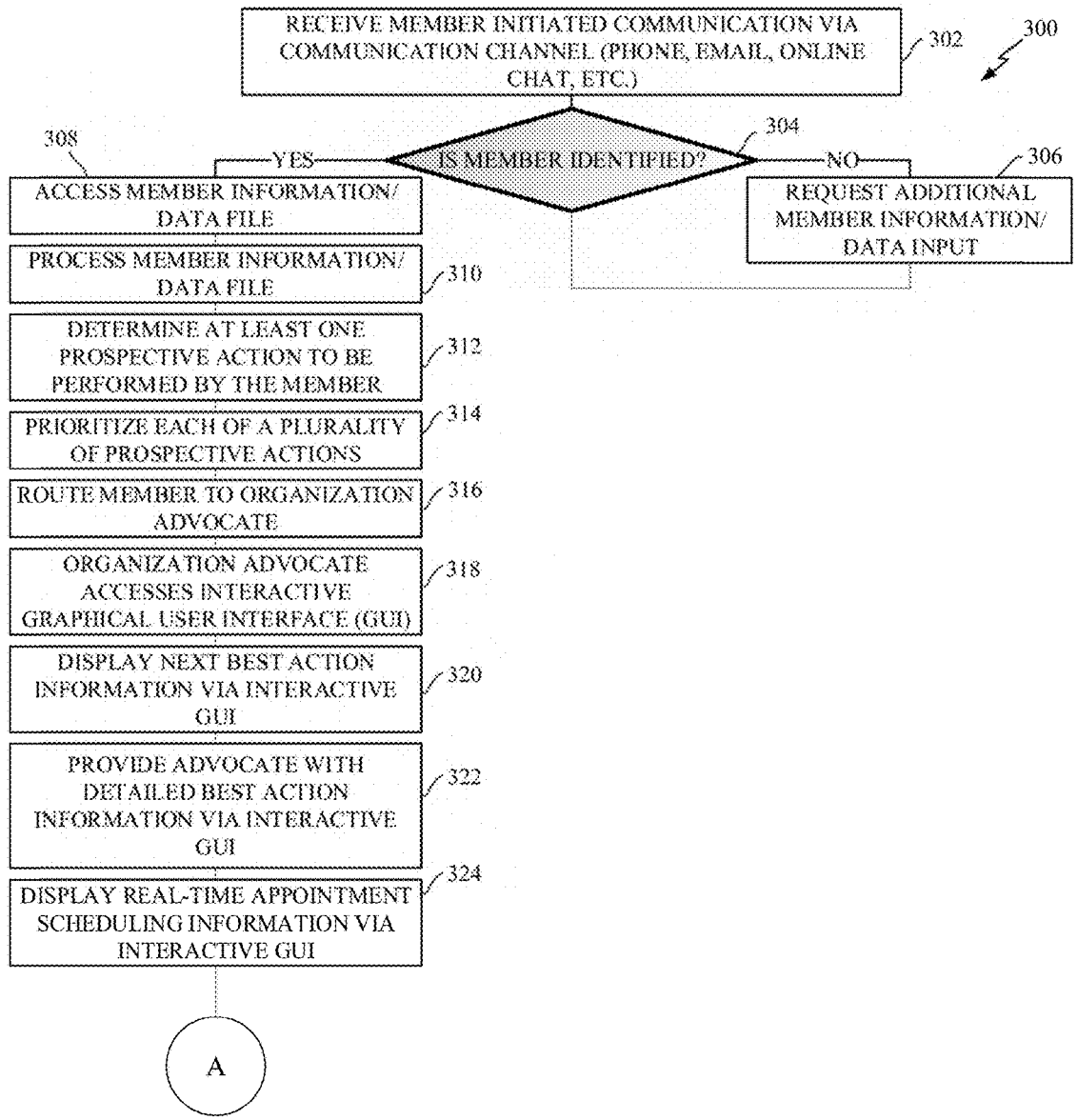
FIGS. 3A and 3B illustrate a flow diagram of an overview of a method of tailoring communication with a member of an organization implementing the system of FIG. 2 and intelligent interactive graphical user interface (GUI) according to an embodiment of the present disclosure.
Figure 3B:
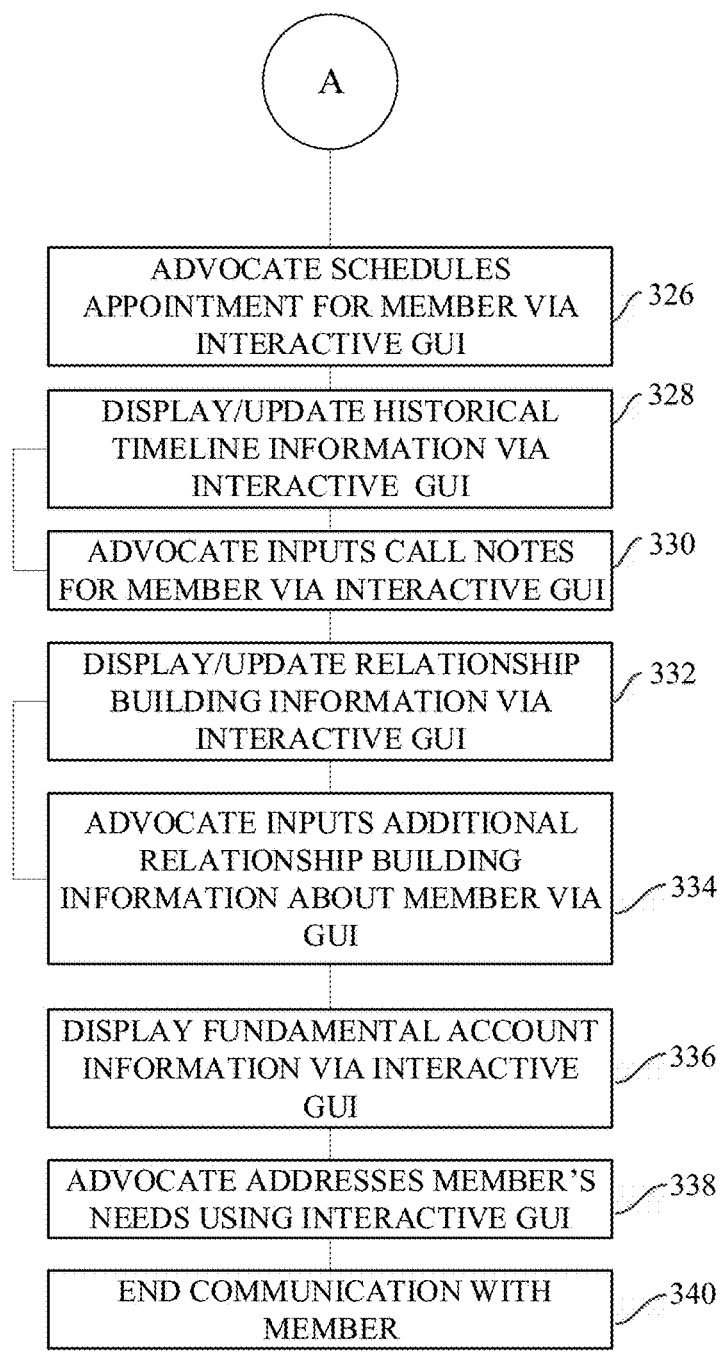

Referring generally to FIGS. 2, 3A and 3B, when the member communicates with the secure computing environment 102, the member's communication is directed from the input/output interface 208 to the authentication component 108. The authentication component 108 determines the identity of the member 304, for example as described herein above with respect to FIG. 1. When the member initiating the communication is identified, the authentication component may then associate the member with the appropriate member information file(s) and access the appropriate member information file(s) 308. Further, when a new member of the organization contacts the secure computing environment 102, the authentication component 108 may not recognize the member's communication source, e.g., telephone 104, computer 106, 202, or smart device 204. When this occurs, the member may be requested to provide additional information 306 through the input/output interface 208, for example their member ID and/or date of birth (DOB) for authentication purposes. When the member subsequently contacts the secure computing environment 102, the authentication processor 108 uses, for example, IVR to automatically identify the member. For example, if the member uses the telephone 104, the authentication processor 108 is configured to identify the member based on the user input while on the telephone.

The secure computing environment 102 also includes the CEE 110 as described herein. The CEE 110 may collect consumer data and provide structured data to connect with the member on an individual level. In addition, the CEE 110 may also compile learning attributes and organize information into a comprehensive consumer engagement record for transmission within the network. In addition, the CEE 110 may access and process account information and other customer-centric data to power decisions for marketing, omni-channel member engagement. This results in increased intelligence and efficiency, enhancing effectiveness of call center processing according to the disclosure. One example of such account information and other customer-centric data are demographic data, recent claims data, program enrollments and/or opportunities data, current state data, incentive opportunities data, risk assessment results data, and the like.

Once the CEE 110 has accessed and processed the account information and other customer-centric data 310, the CEE 110 may determine at least one prospective action to be performed by the member or on the member's account, the prospective action being determined from a plurality of prospective actions using at least one prioritization model. For example, one prospective action that may be determined is an Annual Visit if the CEE 110 determines the member has not yet had an Annual Visit reflected in the data processed by the CEE 110. The CEE 110 may also prioritize each of plurality of prospective actions when the CEE 110 determines there is more than one prospective action relevant to the member and/or member's account.

According to one exemplary prioritization model, the prioritization model may have a plurality of priority levels. A first priority level may be a High Service priority level, or offers or actions that require immediate attention. The second priority level may be a Program Management level, or offers or actions that may be relevant to a current program the member is a part of or wellness maintenance for the particular member. The third priority level may be a STARs Measures level (e.g. a Centers for Medicare and Medicaid Services rating factor), or offers or actions that are proactive steps to help prevent more serious consequences in the future. The fourth priority level, may be a Low Service priority level, or actions or offers that are related to account maintenance. Priority levels may be automatically applied or adjusted as a function of member data or other factors.

The secure computing environment 102 further includes a conversation management data storage database 210. The conversation management data storage database 210 stores specially configured information for communicating with the member including at least member information and engagement information. The conversation management database 210 houses data processed and/or structured data generated by the CEE 110 as described herein. In an illustrative embodiment, the present disclosure may be implemented within the healthcare industry. In this embodiment, the secure computing environment 102 may include several specially configured data stores such as, for example, a pharmacy claims storage, a program consumption storage, a medical claims storage, a screening results storage, an attitudinal data storage, a provider availability storage, a geographic data storage, a demographic data storage, and a cost of care storage. The aforementioned data stores may be implemented as stand-alone data stores within the secure computing environment 102, or they may be subcomponents of the conversation management data storage database 210. One skilled in the art should appreciate that additional stores of data may be implemented as a function of the organization, network and services/products provided.

In addition, the CEE 110 may also be configured to determine next best action information, real-time appointment scheduling information, historical timeline information, relationship building information, and fundamental account information. Further, the information determined by the CEE 110 may be displayed as structured data on an interactive, tailored graphical user interface (GUI) 400 as described in greater detail hereinafter.

Upon the specific processes performed by the CEE 110 being performed, the member connection is routed to an organization advocate within the network and the member's file is transmitted to the advocate's device 214. The advocate should be a person competent to handle most if not all of the member's needs. The organization's advocates may also be segregated into tiers based on complexity of issues. For example, in a healthcare industry embodiment, the organization may have a Tier 1 benefit advocate, a Tier 2 advocate, and a Tier 3 advocate. For example, the benefit advocate may be a competent advocate when the member has infrequent issues, i.e., the member is in good standing and mainly needs routine/preventative actions. The Tier 2 advocate may be a competent advocate when the member has complex issues, i.e., the member frequently contacts the secure computing environment 102 or is an non-member individual. The Tier 3 advocate may be a competent advocate when the member has significant issues, i.e., the member has chronic, complex issues.

In addition, when the member connection is routed to the appropriate advocate's device 214, an interactive, tailored graphical user interface (GUI) 400 may be displayed on the appropriate advocate's device 214. An exemplary embodiment of the GUI 400 is shown in and will be further described with respect to FIG. 4.

Referring now to FIGS. 3A and 3B, functionality and processing 300 implemented, such as via a CEE 110 in conjunction with the intelligent, interactive GUI for tailoring communication with a member of an organization implementing the system of FIG. 2 is described in greater detail. The system receives a member initiated communication from the member's communication source, e.g., telephone, computer, or smart device through the secure computing environment 102, illustrated as block 302. The member is then directed to the authentication component to determine the identity of the member, illustrated as block 304. If the member is not identified, the authentication component requests additional member information/data via the input/output interface, illustrated as block 306. The authentication component 108 may request additional member information until the authentication component 108 is able to identify the member. Once the member has been identified, the system 200 accesses the appropriate member information file(s) via the CEE, illustrated as block 308. The system then processes the member information file(s) via the CEE, illustrated as block 310.

Based on the information processed from the member's information file, the CEE determines at least one prospective action to be performed by the member or on the members account, illustrated as block 312. The CEE may also prioritize each of a plurality of prospective actions determined by the CEE based on at least one prioritization model, such as described hereinbefore.

Once the CEE 110 performs these processes, the member connection may be routed to an organization advocate within the network and the member's file is transmitted to the advocate's device, illustrated as block 316. The advocate may then access an interactive, tailored GUI based on the member file transmitted to the advocate's device, illustrated as block 318.

The interactive, tailored GUI may then display next best action information for the member, illustrated as block 320, real-time appointment scheduling information, illustrated as block 324, historical timeline information, illustrated as block 328, relationship building information, illustrated as block 332, and fundamental account information, illustrated as block 336.

The interactive, tailored GUI may then provide the advocate with additional structured information or actions to assist the member when the advocate interacts (i.e., clicks on) the best action information. For example, the GUI may display more detailed best action information such as additional guidance and scripts to help the member with the recommended actions while in communication with the member, illustrated as block 322. Further, the system may allow the advocate to schedule an appointment on behalf of the member with the member's provider, illustrated as block 326. According to another example, the system may receive and store call notes from an advocate to add to the historical timeline information, illustrated as block 330. Similarly, the system may also receive and store additional relationship building information about the member from an advocate, illustrated as block 334. When the system receives and stores additional historical member timeline information and relationship building information, the CEE 110 updates the historical member timeline information as illustrated by blocks 328 and 332, respectively.

The system and interactive, intelligent GUI enables the advocate to address the member's needs, illustrated as block 338. Once all of the member's needs have been addressed, the system may end the communication with the member, illustrated as block 340.

Figure 4:
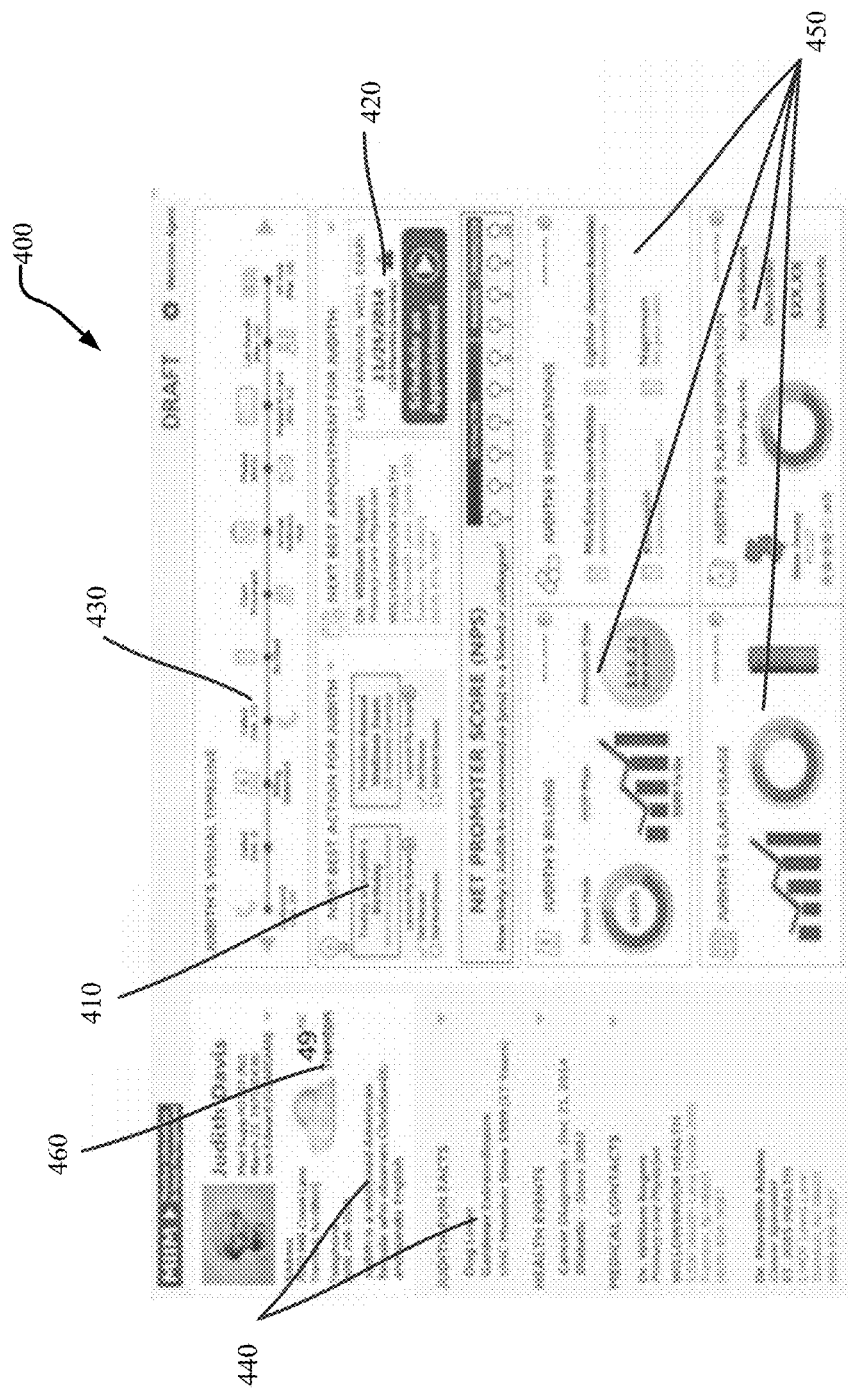
FIG. 4 illustrates an exemplary embodiment of a tailored GUI according to an embodiment of the present disclosure.

As shown in FIG. 4, the GUI 400 may display a variety of structured data regarding the member's account to help facilitate the communication and build a relationship between the member and the advocate and add personalization. Some examples of information the GUI 400 can display is next best action information 410, real-time appointment scheduling information 420, historical timeline information 430, relationship building information 440, and fundamental account information 450. According to an embodiment of the present disclosure, the interactive, tailored GUI 400 may display at least 80 percent of a member's relevant account information within one interaction (i.e., click) with the GUI 400.

The next best action information 410 is at least one prospective or predictive action that has been identified by the CEE 110 to be performed by the member or on the member's account. In an illustrative embodiment, the present disclosure may be implemented within the healthcare industry. In this embodiment, the next best action information 410 may include, but are not limited to, medical procedures, office visits, medical screenings, and account maintenance. In addition, when there is a plurality of prospective actions identified and prioritized by the CEE 110, the GUI 400 may be configured to display the plurality of prospective actions based on the priority determined by the CEE 110 as the next best action information 410. By presenting the next best action information 410, the advocate can effectively understand and communicate gaps in a member's needs.

The advocate can interact (i.e., click on) the next best action information 410 presented on the tailored GUI 400 to access additional guidance and scripts to help the member with the recommended actions while in communication with the member. Additionally, the tailored GUI 400 may also present real-time appointment scheduling information to help the member.

Figure 5:
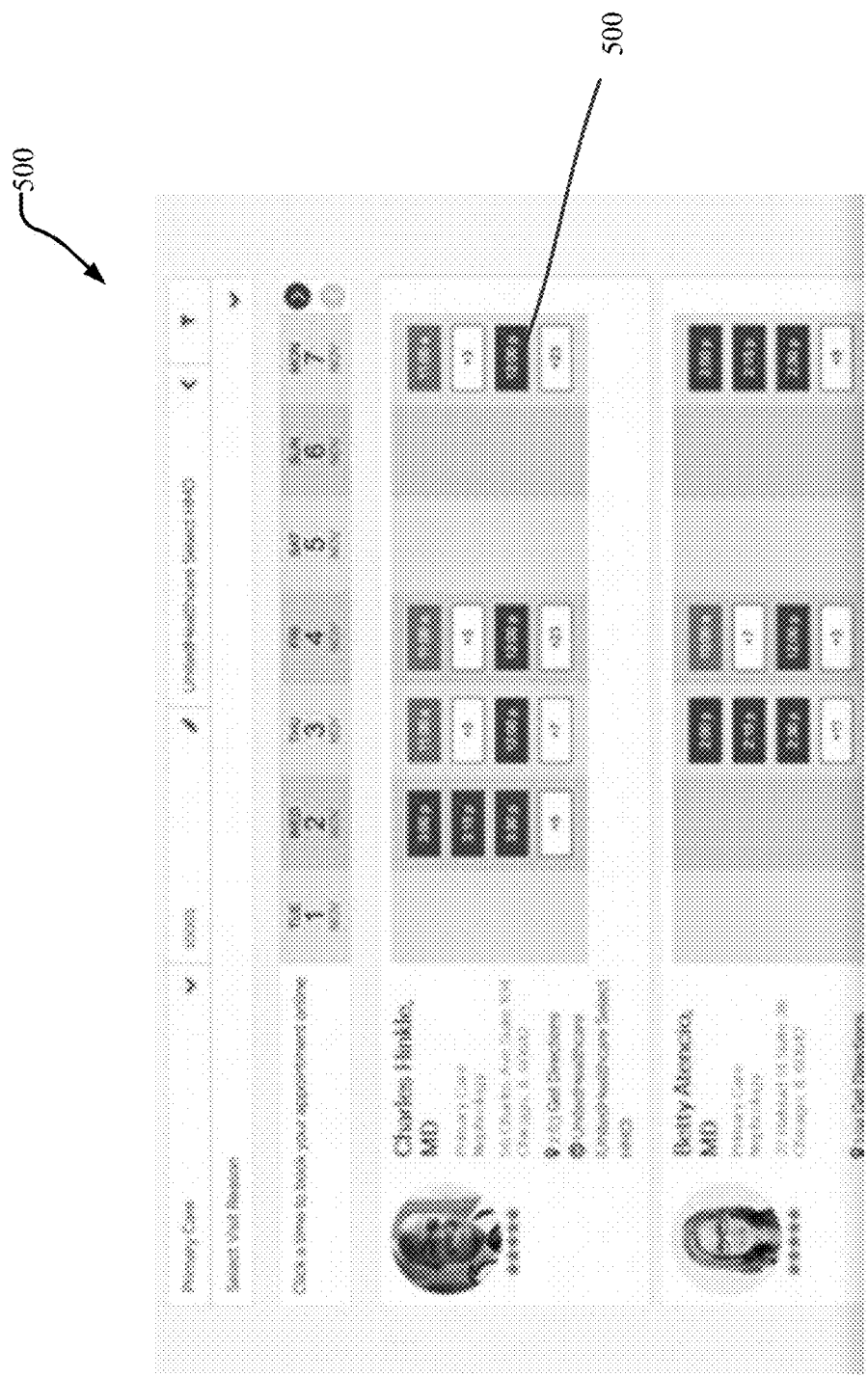
FIG. 5 illustrates an exemplary embodiment of a scheduling interface connected to the interactive, tailored GUI of FIG. 4 according to an embodiment of the present disclosure.

The real-time appointment scheduling information 420 is information related to the real-time availability for a provide for an appointment of a member's service provider. The real-time scheduling information 420 may also allow the advocate to schedule an appointment on behalf of the member with the member's provider. Accordingly, the CEE 110 may be directly integrated into a provider's scheduling system, through an appropriate interface, to provide real-time updates on appointment availability and allow the advocate to schedule these appointments. The advocate can interact (i.e., click on) the real-time scheduling information presented on the interactive, tailored GUI 400 to access additional availability times 510 for a member's service provider through a scheduling interface 500, as shown in FIG. 5. The interactive, tailored GUI 400 provides better service for the member and an enhanced phone call experience with the advocate for the member by providing real-time appointment scheduling information 420 and ensuring these relevant appointments are scheduled. In addition, the representative can schedule the appointment for the caller without needing to engage in a multi-minute three-way call and avoid unnecessary utilization of network resources.

The tailored, interactive GUI 400 may also be configured to present historical timeline information 430 to enhance member phone call experience. The historical timeline information 430 is a visual timeline of past member interactions with the organization and highlights key events relevant to the member's service. The historical timeline information 430 provides details about the previous member interactions with the organization. In addition, the tailored, interactive GUI 400 may display communications previously mailed to the member and the information the communications contained in the historical timeline information 430. The historical timeline information 430 gives the advocates a perspective on what a member may be experiencing and provides a personalized feel to the communication between the member and the advocate.

According to the disclosure, the historical timeline information 430 may be updated substantially in real-time by the advocate, so that if the member is transferred to another advocate the historical timeline information 430 will represent the present state of interactions with the member. The tailored GUI 400 may receive call notes from an advocate to add to the historical timeline information 430. Once the advocate has input the call notes, the CEE 110 may store the newly entered notes in the conversation management data storage 210. In addition, the CEE 110 may update the historical timeline information based on the newly entered notes.

Relationship building information 440 may also be used to add a personalized touch to a communication between the advocate and the member. Relationship building information 440 is personalized information that may be used in future communications when the member speaks to an advocate. Some examples of relationship building information may be, but are not limited to, life facts about the member, such as hobbies, group membership, marital status, and languages, compassion elements, such as significant health conditions and death of family members, and the like. Another example of relationship building information 440 that may be presented by the tailored GUI 400 is weather information 460 based on the location of the member determined by the CEE 110. A further example of relationship building information that may be presented by the tailored GUI 400 is a local time for the member based on the location of the member. The CEE 110 may be directly integrated into an external system to provide real-time updates on weather information and alerts.

Similar to the historical timeline information 430, relationship building information 440 may also entered into the tailored GUI 400 by an advocate to be used on future phone calls to further a relationship between the organization and the member. In addition, once the new relationship building information 440 is entered, the CEE may store the new information and update the existing relationship building information 440 to add the new information.

Fundamental account information 450 are key details about the member's account. Such information may include, but is not limited to, billing information, account usage information, and member service plan details. The interactive, tailored GUI 400 makes the fundamental account information more readily available to help resolve member communications quicker and more efficiently than previously possible.

Although aspects of the present disclosure are described with respect to embodiments in a healthcare context, it should be understood that various disclosed techniques can be used in numerous other fields of technology in which intelligent routing involves sensitive information. Various applications of the disclosed techniques provide substantial improvements to the functioning of the computer apparatus and the technical environments in which the various applications are implemented.

The improved systems and devices implementing a call-channel graphical user interface for an information processing system improves the customer's experience in multiple areas: enabling proactive steps to managing the customer's needs, providing more ways for representatives to make meaningful connections with every customer on every call using structured data, and driving first call resolution for their issues. Representatives accessing the structured data presented, and having access to the data with analytics behind the presented data, will be more adaptable to changing situations in the customer's life, which not only enhances and speeds up health information and customer call processing, but also helps reduce system bandwidth consumption and the time needed to resolve issues managed through the health information processing system. User experience is enhanced by an experience that is customized to the customer's needs.

In addition, the improved customer resource management (CRM) and call processing systems according to the disclosure provides opportunities for the member to improve their use of services, opportunities for saving money, and programs that may help the members address their needs.

Aspects of the present disclosure contain elements and/or combination of elements that transform information from a variety of sources and in a variety of different formats into structured data in one or more data storage systems. The processed data is configured for accessibility by one or more computer processors to dynamically and substantially instantaneously provide proactive actionable results based on the data.

Aspects of the present disclosure improve the particular technical environment of personalized information technology by allowing customization of customer interactions from a variety of sources in which disparate formatting among the sources are accommodated in a structured compilation of stored data. Aspects of the present disclosure improve the operation of certain customer interaction organizations, dashboards, machines, networks and/or systems by generating a structured form of information including real-time representations of customer interactions, thereby improving the quality of customer care and experience, and reducing costs.

In various embodiments, software may be stored in a computer program product and/or loaded into a special purpose computer system using removable storage drive, hard disk drive or communications interface. Aspects of the disclosed process may be implemented in control logic or computer program instructions, which when executed causes the special purpose computer system to perform the functions of various embodiments as described herein.

Implementation of system including special purpose machines to perform the functions described herein will be apparent to persons skilled in the relevant art(s).

The systems, machines and processes described herein may be used in association with web services, utility computing, pervasive and individualized computing, security and identity systems and methods, autonomic computing, cloud computing, commodity computing, mobility and wireless systems and methods, open source, biometrics, grid computing, artificial intelligence, machine learning, and/or mesh computing.

Databases discussed herein are generally implemented on special purpose machines, systems and/or networks to ensure privacy of confidential health information and data security is preserved in accordance with industry standards and government regulations. The databases may include relational, hierarchical, graphical, or object-oriented structure and/or other database configurations. Moreover, the databases may be organized in various manners, for example, as data tables or lookup tables. In addition to the inventive techniques for combining health information with social media information disclosed herein, association of certain data may be accomplished through various data association technique such as those known or practiced in the art. One skilled in the art will also appreciate that databases, systems, devices, servers or other components of the disclosed systems or machines may consist of any combination thereof at a single location or at multiple locations, wherein each database, system or machine may include of suitable security features, such as firewalls, access codes, encryption, decryption, compression, decompression, and/or the like. The special purpose systems, networks and/or computers discussed herein may provide a suitable website or other Internet-based graphical user interface which is accessible by users.

Functional blocks of the block diagrams and flowchart illustrations support combinations of means for performing the specified functions, combinations of steps for performing the specified functions, and program instruction means for performing the specified functions. It should be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Moreover, although the present disclosure has been described herein with reference to the accompanying drawings, it is to be understood that the present disclosure is not limited to those precise teachings, and that various other changes and modifications may be made by one skilled in the art without departing from the spirit and scope of the present disclosure.

What is claimed is:

1. A system for intelligent processing of a communication from a member, comprising:
    an authentication component authenticating an identity of the member;
    a consumer engagement engine:
        accessing member data related to engagements with the member;
        processing the member data related to engagements with the member;
        determining at least one prospective action to be performed by the member from a plurality of prospective actions based on the member data and a prioritization model;
    a conversation management data storage database storing specially configured information for communicating with the member including at least member information and engagement information; and
    an interactive Graphical User Interface (GUI) accessing and displaying, on a first portion of the GUI, the determined prospective action and at least one of member information and engagement information and, on a second portion, real-time appointment scheduling information for a third-party provider,
    wherein the prioritization model comprises a plurality of priority levels indicating different levels of required attention for prospective actions, each of the plurality of prospective actions associated with one of the plurality of priority levels.

2. The system of claim 1, wherein the consumer engagement engine further schedules an appointment with the third-party provider for the member.

3. The system of claim 1, wherein the consumer engagement engine further determines historical member information about the member.

4. The system of claim 3, wherein the GUI further displays, on a third portion of the GUI, the historical member information about the member.

5. The system of claim 4, wherein the GUI further receives input historical information about the member from an advocate.

6. The system of claim 1, wherein the consumer engagement engine further determines relationship building information about the member for use by an advocate.

7. The system of claim 6, wherein the GUI further displays, on a fourth portion of the GUI, the relationship building information about the member.

8. The system of claim 6, wherein the GUI further receives additional input relationship building information about the member from an advocate.

9. The system of claim 8, wherein the GUI displays at least 80 percent of member information and engagement information within one interaction with the GUI.

10. The system of claim 1, wherein the consumer engagement engine further structures the member data for communication with the member.

11. A method implemented on a system for intelligent processing of a communication from a member, the method comprising:
    authenticating, by the system, an identity of the member;
    accessing, by the system, member information file based on the identity of the member;
    processing, by the system, the member information file;
    determining, by the system, at least one prospective action to be performed by the member from a plurality of prospective actions based on the processed member information file and a prioritization model;
    routing, by the system, the member to an organization advocate;
    displaying, by the system, the determined prospective action and at least one of member information and engagement information on an interactive graphical user interface (GUI); and storing, by the system, specially configured information for communicating with the member including the member information and engagement information, wherein the member information and engagement information comprise real-time appointment scheduling information for a third-party provider, wherein the prioritization model comprises a plurality of priority levels indicating different levels of required attention for prospective actions, each of the plurality of prospective actions associated with one of the plurality of priority levels.

12. The method of claim 11, further comprising requesting additional member information input from the member, when the identity of the member is not authenticated.

13. The method of claim 11, further comprising prioritizing each of the determined prospective actions when more than one prospective action is determined.

14. The method of claim 11, wherein the member information and engagement information further comprise:
historical member information about the member;
relationship building information about the member; and
fundamental member account information.

15. The method of claim 11, further comprising scheduling, by the system, an appointment with a service provider for the member.

16. The method of claim 11, further comprising receiving, by the system, input historical information about the member from an advocate.

17. The method of claim 11, further comprising receiving, by the system additional input relationship building information about the member from an advocate.

* * * * *